July 28, 1970  G. R. TILLOTSON  3,521,710
VINE CROP HARVESTER
Original Filed April 4, 1966  3 Sheets-Sheet 1
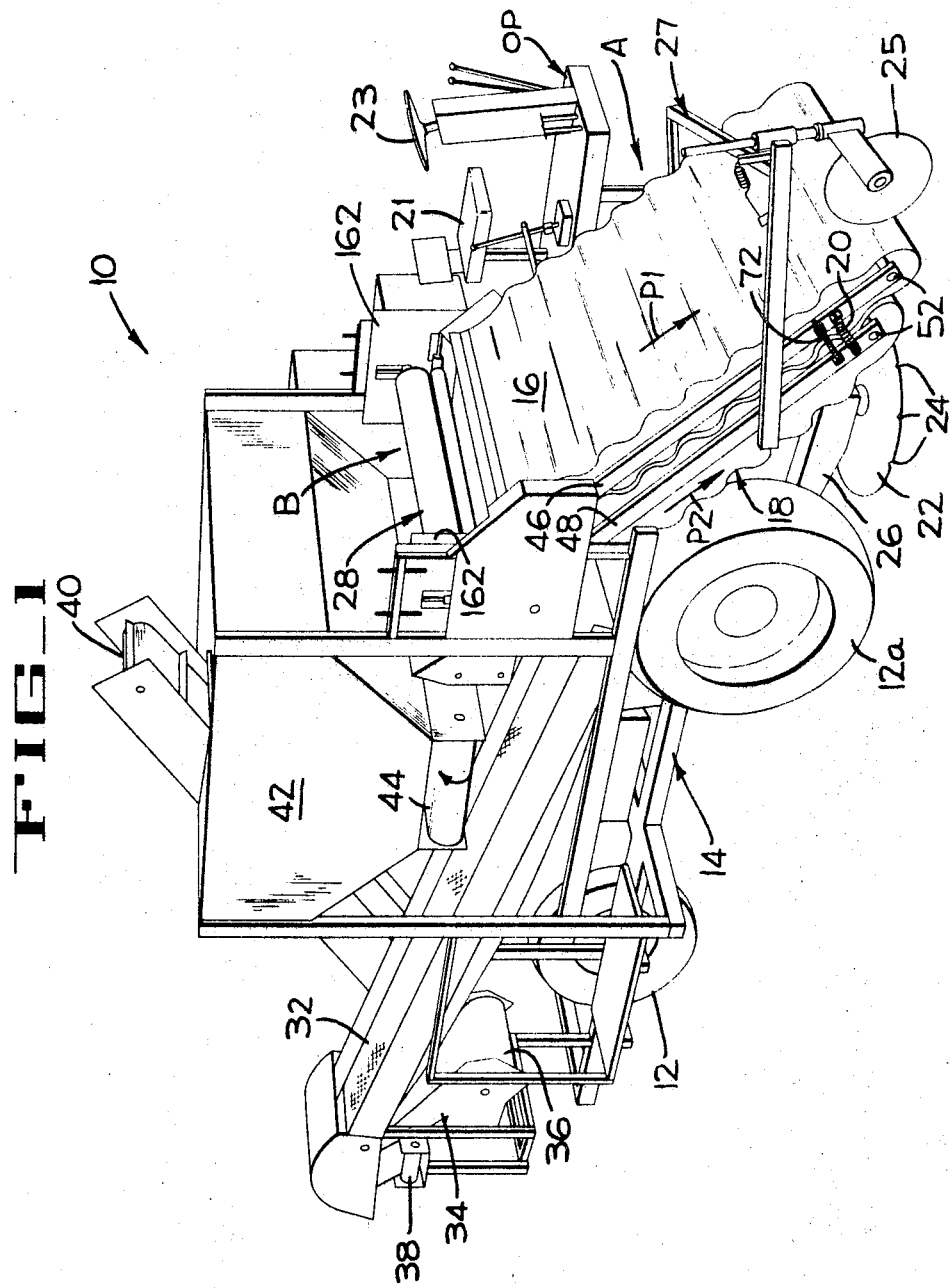
FIG_1
INVENTOR
GLEN R. TILLOTSON
BY F.W. Anderson
C.C. Tripp
ATTORNEYS

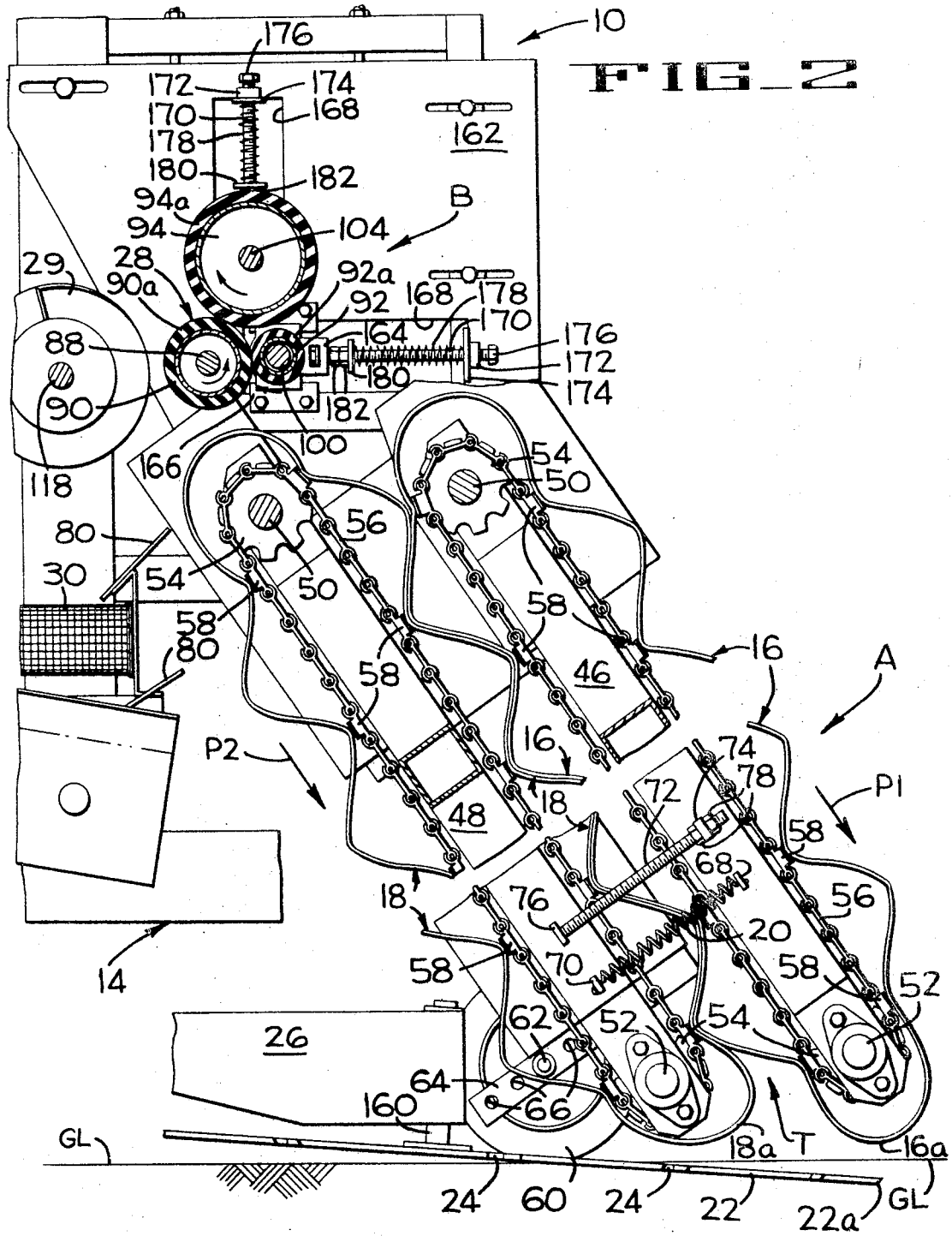

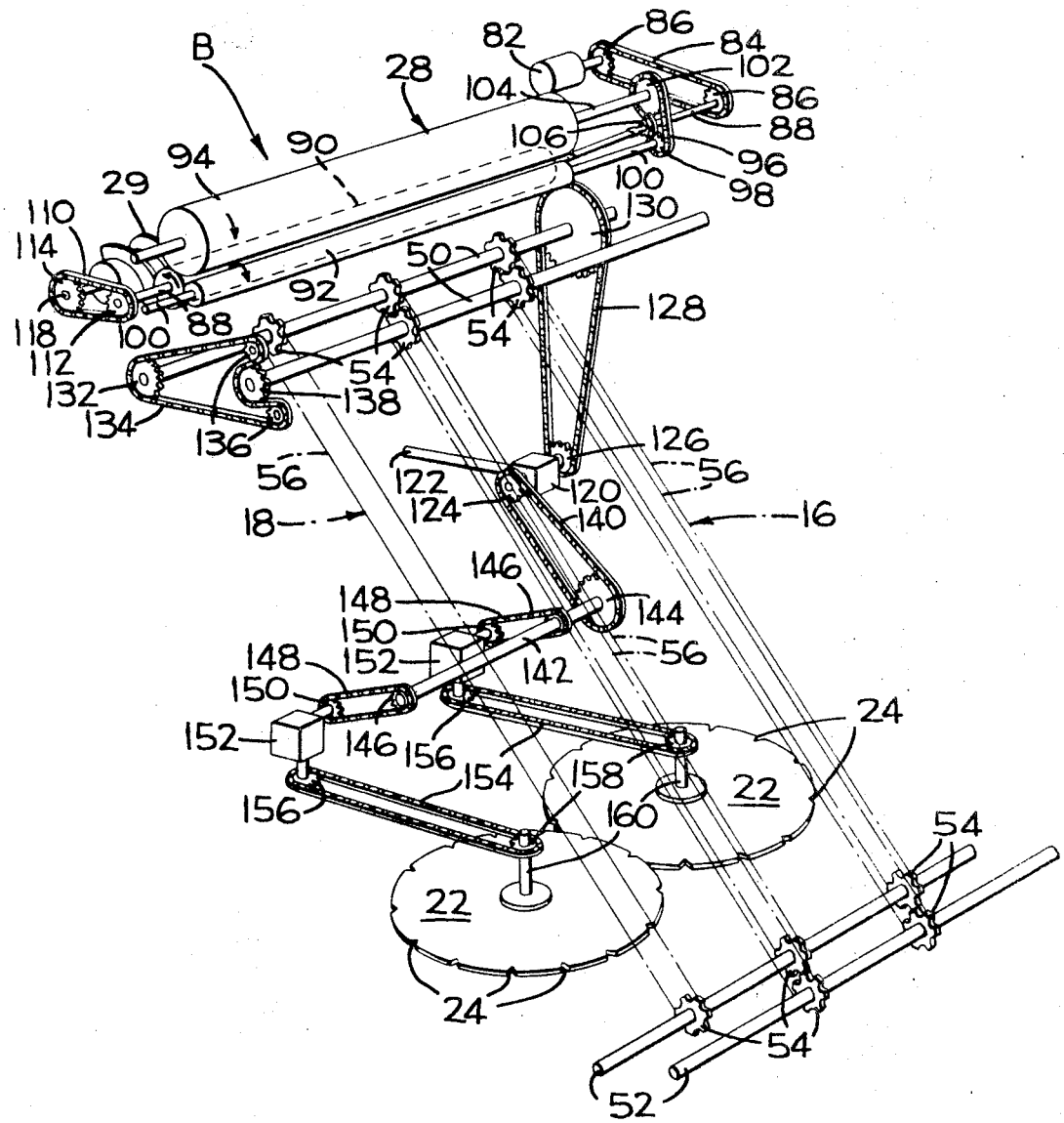
FIG_3

United States Patent Office 3,521,710
Patented July 28, 1970

3,521,710
VINE CROP HARVESTER
Glen R. Tillotson, Minnetonka, Minn., assignor to FMC Corporation, San Jose, Calif., a corporation of Delaware
Original application Apr. 4, 1966, Ser. No. 540,002, now Patent No. 3,387,612, dated June 11, 1968. Divided and this application Apr. 22, 1968, Ser. No. 723,175
Int. Cl. A01d 31/00
U.S. Cl. 171—61                               2 Claims

ABSTRACT OF THE DISCLOSURE

Severed cucumber vines and attached cucumbers are picked up from the ground by downwardly slanting, superposed conveyor belts. The belts have flexible undulations that are urged together by springs.

---

This application is a division of my copending application, Ser. No. 540,002, filed Apr. 4, 1966, now Pat. No. 3,387,612, issued June 11, 1968.

This invention relates to improvements in agricultural harvesting machines and more particularly to harvester pick up conveyors for vine growing crops.

Due to the relative unavailability of domestic labor to economically perform hand harvesting of certain crops, increasing effort has been given to mechanizing harvesting of certain crops. This invention is an example of such an effort and it is particularly adapted to harvest vine growing crops which will tolerate rather rough treatment as compared to tomatoes, for example, which injure rather easily and are accordingly rendered useless for certain commercial purposes.

For further details and features of the harvester incorporating the present invention reference should be made to the U.S. application of Olin Looker Ser. No. 537,334, filed Mar. 25, 1966, now Pat. No. 3,387,611, issued June 11, 1968 and the application of Russell J. Hurliman, Ser. No. 537,470, filed Mar. 25, 1966, now abandoned. Both applications are assigned to the assignee of the present invention and are incorporated herein by reference.

Although the invention will be described in connection with the harvesting of pickle type cucumbers it is to be understood, as suggested above, that it will perform equally well with vine type crops which do not injure very easily.

Experience with the harvesting of cucumbers or the like from green vines has shown that properly constructed and oriented snapper rolls are required if the harvester is to be effective. This forms the subject matter claimed in my parent application.

The vines are picked up from the ground and fed to the snapper rolls by superposed, undulating conveyor belts.

Another object of the present invention is to resiliently urge the overlying conveyor belts in contact with each other with the force of such contact being sufficient to draw vines between adjacent reaches of the belts without crushing the vine bearing crop.

This and other objects of this invention will become apparent from consideration of the following description in connection with the accompanying drawings, in which:

FIG. 1 is a perspective of the harvester employing the features of this invention.

FIG. 2 is an enlarged fragmentary longitudinal off-set section of the forward portion of the harvester shown in FIG. 1.

FIG. 3 is a perspective of a drive train for actuating the vine removing elements and pickle separating rollers.

In FIG. 1 there is shown a preferred form which the harvester of this invention may take in practice and it is generally indicated by the numeral 10. As is evident by this figure the harvester is self propelled by a rearward wheel 12 and a pair of forward wheels, 12a (only one being shown) that are suitably rotatably mounted on axles supported on the main frame 14. Power from a suitable internal combustion engine has its output connected to drive the forward wheels 12a. On the forward portion of the main frame and positioned in a forwardly and downwardly extending position there is a vine pickup mechanism A comprising an upper undulated flexible belt 16 and a lower belt 18 of a similar nature. These belts travel, respectively, in the direction of the arrows P1 and P2 so that the confronting reaches of each belt, that is to say the lower reach of the upper belt 16 and the upper reach of the lower belt 18, are in intimate contact and are held in such contact by a tension spring 20 in a manner which will be explained in greater detail hereinafter.

Mounted below the belts there is a pair of cut-off discs 22 (both of which are shown in FIG. 3) provided with circumferentially spaced triangular notches 24. These discs are rotatably carried by respective mounting assemblies 26 which are in turn supported by the main frame 14. As the machine advances along a row of crops the discs 22 project under the ground line G.L., shown in FIG. 2, and sever the vines which are grasped and fed upwardly by belts 16 and 18. An operator's platform O.P. mounting a seat 21, a steering wheel 23, and various suitable controls, is located so that the operator is in full view of a guide wheel 25 pivotally mounted on a forwardly extending support frame 27.

The severed vines are carried upwardly to a separating mechanism B preferably comprising a group of rollers 28 which serve to separate the product from the vine and are arranged to direct the stripped vine to a screw conveyor 29 (FIG. 2) which discharges the vines laterally of the machine and directs the severed pickles onto a conveyor for further processing. The product removed from the vines is deposited on a front cross conveyor 30 (FIG. 2) which discharges onto a rearwardly extending slightly upwardly inclined sorting and preliminary cleaning conveyor 32. The conveyor belt of conveyors 30 and 32 is made of loosely woven wire which permits dirt, sand and other foreign material to fall to the ground as the product is conveyed thereby.

At the terminal end of the conveyor 32 there is provided a duct 34 which directs high velocity air derived from a blower 36 onto the product. From the conveyor 32 the product is discharged to a rear cross conveyor 38 which transports the product laterally to an elevating conveyor 40 whose discharge end is located in the opening of a hopper 42 which accumulates the harvested product. The bottom wall of the hopper is defined by a lateral discharge conveyor 44 which is movable in the direction indicated by the arrow, to unload the hopper of accumulated product. In accordance with conventional farming practice it should be understood that the hopper can be unloaded into a truck while the harvester is continuing its advance along a row of crops.

Thus according to the above introductory description of this invention it is clear that the harvester cuts the vines by the rotating cutting discs 22 and moves them upwardly between the belts 16 and 18 to the separating mechanism B wherein the pickle is removed from the vines. At this point the vines are removed and discharged to the ground and the desired product is moved laterally by the ground cross conveyor 30 to the rearwardly extending conveyor 32. Dirt and other foreign material are in part removed while the product is on the conveyor 32 and remainder of such foreign material is removed when the product is transferred between the conveyor 32 to the conveyor 38 by a blast of air from the blower 36. The product is thence elevated upwardly and forwardly by the elevating conveyor 40 for accumulation in the hopper 42.

The belts 16 and 18 are mounted to assume an undulating or sinusoidal configuration and are timed such that the confronting surfaces of each belt are in intimate contact on the run which is travelling upwardly toward the separating mechanism B. Each belt is made of suitable reinforced flexible rubber-like material which is easily adapted to assume the undulating or sinusoidal shape. Each of the belts is mounted on generally rectangular frame structures 46 and 48, the upper and the lower frame structures respectively, which are suitably pivotally supported on the main frame of the machine. Each frame structure rotatably mounts longitudinally spaced transversely extending upper and lower shafts, 50 and 52 respectively, on which are secured sprockets 54. Trained about the sprockets of each frame structure there are endless chains 56 which carry regularly equally spaced mounting blocks 58. These mounting blocks are of a length substantially equal to the width of the belts 16 and 18. At regularly spaced intervals the belts are attached to these mounting blocks in any suitable manner and for example, they may be bolted to the mounting blocks, at intervals which allow the belt to assume the illustrated undulating shape. Due to the relative stiffness of the belting used the illustrated shape will be maintained. As will be explained in connection with the mechanism shown in FIG. 3 these belts are orbited in timed relation so that the undulations of the respective belts will register.

To support the frame structures 46 and 48 a desired distance above the ground there is provided a tired idler wheel 60 which is rotatably supported on an axle 62 mounted on a bracket 64 which is in turn rigidly connected to the lower frame structure 48. A series of holes 66 formed in a bracket 64 are provided so that the axle 62 may be mounted in any one of the holes in order to raise or lower the frame structures with respect to the ground line.

In accordance with this invention, means are provided between the frame structures 46 and 48 for biasing the frame structures toward each other and for adjusting the amount of such bias. Part of such means include the spring 20 which has its ends secured to small tabs or brackets 68 and 70 which are carried respectively by the frame structures 46 and 48. The amount of tension which is exerted by this spring 20 is determined by a threaded stud 72 which is slidably disposed through a bracket 74 mounted on the frame structure 46 and one of its ends is in abutting engagement with a stop bracket 76 rigidly connected to the frame structure 48. A pair of nuts 78 are threaded on the stud 72 and are located on either side of the bracket 74. By appropriately manipulating these nuts the distance between the frames 46 and 48, at least at their lower end, can be adjusted and of course the tension on the spring 20 can be varied. By virtue of this construction as the vines which are entrained between the belts 16 and 18 progress upwardly the upper frame 46 may pivot in a counterclockwise direction as viewed in FIG. 2 about the axis of the shaft 50 against the bias of the spring 20. Such movement of the upper frame occurs when removed vines are drawn between the belts 16 and 18. This of course prevents the harvested pickle from being crushed while the force of the spring causes the belts to firmly grip the vine. It is to be noted that when the upper frame 46 pivots in the above mentioned manner the end of the threaded stud 72 is free to move out of contact with the abutment 76. A similar spring and stud arrangement is provided on the opposite lateral side of the frames 46 and 48.

The cutoff discs 22 are of sufficiently large diameter so that the cutting edge 22a is in advance of the throat T defined by the lower ends of the upper and lower belts 16 and 18. It will be noted that the cutoff discs 22 are angled so that the cutting portion of its orbit is below the ground line G.L. This of course allows the stalk of the vine to be cut from the root. By locating the cutting portion of the discs in advance of the throat T the severed vines are easily drawn between the belts 16 and 18. In addition as the belts round the lower sprockets 54 generally arcuate projections 16a and 18a are formed which are effective to sweep the cut vine into the throat.

Referring now to FIG. 3 there is shown the drive train for the separating mechanism B which includes the group of rollers 28, and the drive train for the cutoff discs 22 and the belts 16 and 18. With regard to the drive train for the separating mechanism B there is provided a conventional hydraulic motor 82 driving a sprocket chain 84 trained about sprockets 86 one of which is connected to the output shaft of the motor and the other to a shaft 88 which drives the lower rearward snapping roll 90 rotating in a direction indicated by the arrow. The remaining rollers 92 and 94, the lower forward snapping roll and the upper pressure roll respectively, are driven by a sprocket chain 96 trained about a sprocket 98 mounted on a shaft 100 of the roller 92 and a sprocket 102 mounted on a shaft 104 of the roller 94. The chain 96 is in meshing engagement with a small sprocket 106 secured to shaft 88. The direction of roller rotation is indicated by the arrows. It will be evident in view of the above described construction that output power of the hydraulic motor 82 causes simultaneous rotation of the three rollers by virtue of the described chain and sprocket arrangement.

The screw conveyor 29 is located behind the roller 90, and as stated, serves to dispose the stripped vines laterally of the machine as it advances along a row of crops. This screw conveyor is driven by another sprocket chain 110 trained about sprockets 112 and 114 which are mounted respectively on shafts 88 and 118. Accordingly whenever the rollers are in operation the screw conveyor is in operation.

The power train for driving the conveyors 16 and 18 and the discs 22 is also shown in FIG. 3. Power from the engine is transmitted to a gear box 120 by a shaft 122. On the outputs of the gear box there is mounted sprockets 124 and 126. By means of a sprocket chain 128, trained about the sprocket 126 and a sprocket 130 which is fixed to the upper shaft 50 of the lower conveyor 18, rotation of the shaft 50 is effected. Since the sprockets 54 are secured to the shaft 50 consequent orbital movement of the chains 56 takes place. On the opposite end of the shaft 50 which carries the sprocket 130 there is secured another sprocket 132 driving a sprocket chain 134 which is wrapped around idler sprockets 136 and a driving sprocket 138 which is fixed to the shaft 50 of the upper conveyor 16. Since the sprockets 54 are fixed to this last mentioned shaft driving of the conveyor chains 56 of the upper conveyor is also effected. As is evident by insepction of FIG. 3 it will be noted that the lower shafts 52 of the upper and lower conveyors 16 and 18 respectively carry idler sprockets 54 which are driven by the chains 56.

Driving of the cutting discs 22 is accomplished by a sprocket chain 140, driven by the sprocket 124, which drives a jack shaft 142 by virtue of its meshing engagement with a sprocket 144 carried by the shaft 142. At spaced intervals on the shaft 142 sprockets 146 are mounted for driving corresponding sprocket chains 148 which are trained about sprockets 150 carried by shafts of similar right angle drive units 152. Sprocket chains 154, driven by sprockets 156 drive sprockets 158 which are secured to the shafts 160 of each cutting disc 22, to thereby impart rotation thereto.

In view of the above described power train it is readily apparent that power from the engine transmitted to the gear box 120 by the shaft 122 is effective to cause simultaneous operation of the cutting discs and the upper and lower conveyor.

The separating mechanism B is arranged to remove the crop from the vine, to dispose of the stripped vine, and to direct the detached crop to a cleaning and collection hopper. This is accomplished by providing rollers 90, 92 and 94 which are positioned in the manner shown. The rolls 90, 92 are snapping rollers for pulling vines from the cucumbers restrained by the rollers. The snapping rollers form a downwardly opening nip throat for receiving vines from the conveyor belts 16, 18. The group of rollers are rotatably mounted in bearings supported on side frame members 162 (both of which in FIG. 1) which are in turn carried by structural members of the main frame. Since both ends of each roller 92 and 94 is mounted in an identical manner description of one will suffice for both. As shown in FIG. 2 the shaft 100 of the forward lower roller 92, and the shaft 104 of the upper pressure roller 94 are mounted in bearings carried by slider blocks 164 which are slidably mounted in guideways 166. The guideways are suitably secured, preferably by illustrated bolts, to extend inwardly from the marginal edges of elongate rectangular openings 168 formed in the side frame member 162. To each of the bearing blocks there is attached an elongate threaded stud 170 slidably disposed through a bushing 172 attached to an outwardly extending plate 174 which is mounted on the side frame member 162. On the end of each stud 170 there is threaded a nut 176. A suitable compression spring 178 surrounds each of the threaded studs 170 and it is located between the plate 174 and a washer 180 which is seated against a pair of jam nuts 182. By virtue of jam nuts 182 and the washer 180 a predetermined preload can be applied to the spring 170 and this preload must be overcome before the roller 92 or 94 will slide in their respective guideways 166.

The operation of the above described roller set is as follows: Vines between the belts 16 and 18 are fed by the conveyor belts 16, 18 up into the nip throat formed by the snapping rollers 90, 92. The vines are pulled between the rollers 90 and 92 and thence between the rollers 90 and 94. As the attached pickles encounter the snapping rollers 90 and 92 they are snapped off falling toward the conveyor 30. The stripped vine, which passes between rollers 90 and 94 is fed to the screw conveyor 29 whereupon it is discharged to the ground. Due to the indicated direction of rotation of the rollers and the fact that the rollers 90 and 92 must be in forceful contact the upper pressure roller 94 can only establish rolling engagement with either one of the rollers 90 or 92. However, in the illustrated preferred construction the upper roller 94 is in rolling pressure engagement with the lower rearward roll 90.

As claimed in my parent application, the rubber of rollers 90 and 92, indicated as 90a and 92a, respectively, in FIG. 2 should be of a hardness of 60 to 65 Shore durometer scale A, but the hardness may be as high as 70, and the roller 94, having a rubber surface 94a, should have a Shore durometer hardness of 30 to 35 on scale A.

This invention provides means whereby the contact pressure between the confronting reaches of the undulating belts 16 are spring loaded and 18 can be adjusted to best advantage.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A picking mechanism for removing rooted vines and crops from the ground comprising a machine body, superposed, downwardly slanting conveyor frames with the lower conveyor frame being rigid on said machine body, means for pivotally mounting the upper end of said upper conveyor frame on the body, endless tension members mounted for orbital motion on said frames, flexible undulating conveyor belts secured to the tension members at spaced points along the tension members the undulations of said belts being interfitting, spring means connected between said conveyor frames for pressing the interfitting belt undulations together during normal operation and adjustable stop means interconnecting said conveyor frames for allowing the undulating belts to be brought into firm engagement by said spring means while accomodating upward pivoting the upper conveyor frame in response to crop crushing forces developed between said undulating belts.

2. The picking mechanism of claim 1, wherein said adjustable stop means comprises an abutment on one of said conveyor frames and a stop bolt adjustably mounted on the other conveyor frame with the free end of said bolt normally engaging said abutment in response to the force of said spring means.

References Cited

UNITED STATES PATENTS

| Re. 19,672 | 8/1935 | Malcom et al. | 171—61 |
| 968,522 | 8/1910 | Barber | 171—118 |
| 1,578,600 | 3/1926 | Greatrix | 171—118 |
| 2,561,754 | 7/1951 | Propheter | 56—328 XR |

ANTONIO F. GUIDA, Primary Examiner

U.S. Cl. X.R.

56—327; 171—38